United States Patent [19]

Honnen

[11] 4,313,680
[45] Feb. 2, 1982

[54] REACTOR FOR FAST REACTIONS

[75] Inventor: Lewis R. Honnen, Petaluma, Calif.

[73] Assignee: Chevron Research Company, San Francisco, Calif.

[21] Appl. No.: 91,616

[22] Filed: Nov. 5, 1979

[51] Int. Cl.³ .............................................. B01F 5/06
[52] U.S. Cl. .................................. 366/337; 366/340; 422/224
[58] Field of Search ............... 366/336, 337, 338, 339, 366/340; 422/133, 134, 135, 224; 138/42

[56] References Cited
U.S. PATENT DOCUMENTS 2,802,648  8/1957  Christensen ......................... 366/340
3,195,865  7/1965  Harder ................................. 366/337
4,207,202  6/1980  Cole ................................. 366/337 X Primary Examiner—Robert W. Jenkins
Attorney, Agent, or Firm—J. A. Buchanan, Jr.; R. H. Evans

[57] ABSTRACT

A reactor for mixing fluid components at relatively low flow rates wherein the components have a very short reaction time. The reactor comprises a plurality of spaced-apart, flow-converging members for directing the flow of fluid components along the central axis of the reaction chamber. The reactor further includes a flow-deflecting element arranged downstream of each flow-converging member to divide and direct and the body of fluid flow at right angles from the central axis of the reaction chamber.

5 Claims, 5 Drawing Figures

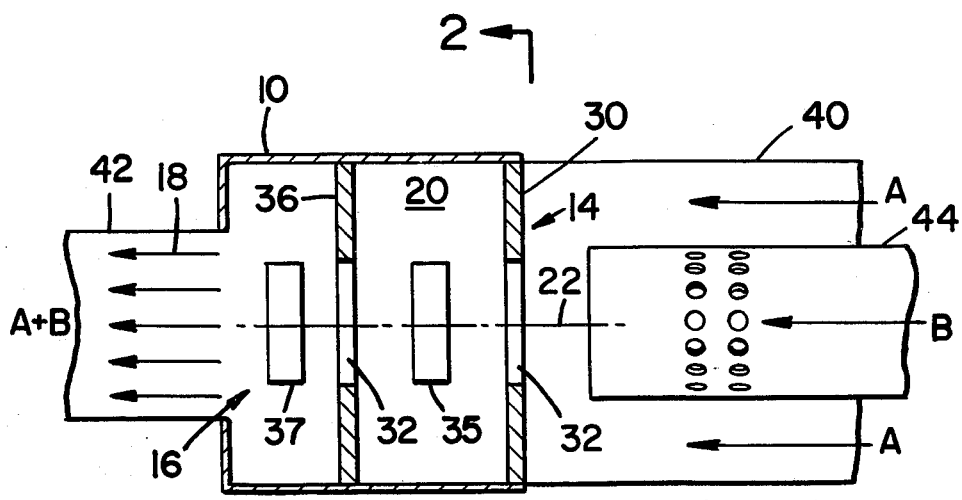
FIG_1
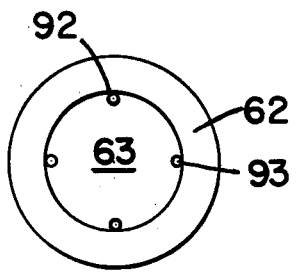
FIG_5  FIG_2
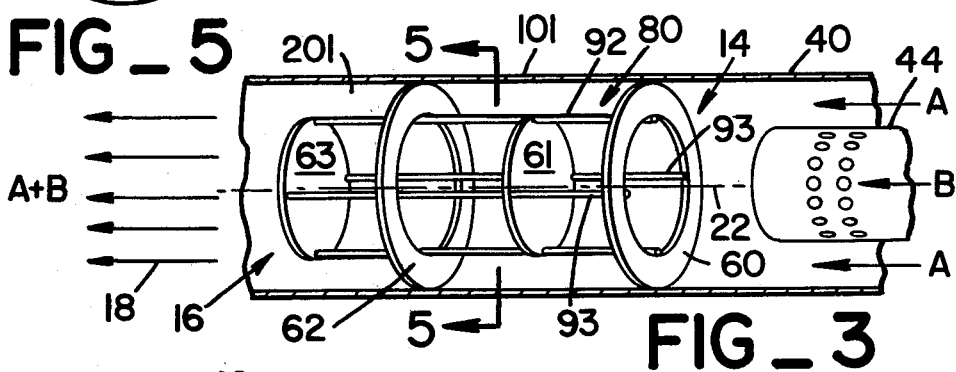
FIG_3
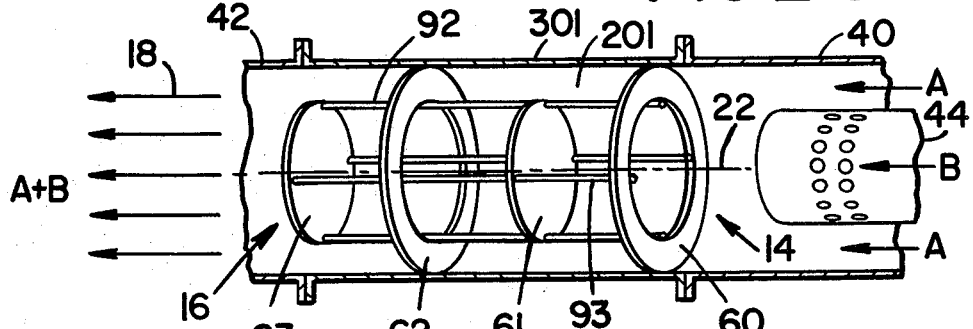
FIG_4

REACTOR FOR FAST REACTIONS

FIELD OF THE INVENTION

The present invention relates to devices known as motionless mixers for the mixing of a plurality of fluid components, and more particularly, to a reactor for reacting fluid materials that have a very short reaction time.

BACKGROUND OF THE INVENTION

For certain reactants, the time for total interaction—complete reaction—is extremely short. Therefore, to avoid undesirable by-products in selected situations, the reactants must be very rapidly and completely mixed. At relatively low flow rates—say in the order of 10 gallons per minute—most prior art mixers do not accomplish complete mixing of reactants where the reactions are very fast. If the flow rate of the components is increased sufficiently, however, these mixers will produce adequate mixing. Unfortunately, in some situations, an increase in the flow rate is not feasible because of the resultant large pressure drop produced across the mixer.

One type of static mixer known in the art is the Kenics mixer, which is essentially described in U.S. Pat. No. 3,286,992, issued Nov. 22, 1966. This mixer comprises a plurality of curved sheet-like elements longitudinally arranged within a hollow cylindrical tube. The curved elements are in fact short right- and left-hand helices that are welded together and arranged in the tube so that each successive element is curved in the opposite sense with respect to the preceding element. Reactants flowing through the mixer are divided at the leading edge of each element. As the flow divides, it follows the channel formed by each element to be divided again at the leading edge of each successive element. By dividing the fluid flow in this manner over a number of elements, mixing of the fluid components may be accomplished.

Another mixer used heretofore is the Koch mixer. The operation of this mixer is described in detail in an article by N. R. Schott, B. Weinstein, and D. LaBombard, "Motionless Mixers in Plastic Processing", *Chemical Engineering Progress*, Vol. 71, No. 1, January 1975. The mixing element of the Koch mixer is an appropriately-shaped assembly that contains a large number of parallel, corrugated metal sheets. The corrugation angle of adjacent layers in the element is reversed relative to the mixer axis so that inclined corrugations of adjacent sheets intersect to form a multitude of mixing cells. Flow entering a particular mixing cell as one stream is divided into two new streams, each leaving the mixing cell in a different direction. Both flow stream upon arriving at the next corrugation intersection are again each divided and rearranged into two new and different streams, each of which may again be divided and rearranged. Adjacent corrugation elements are also rotated 90° with respect to one another to provide a third dimension to the above-described two dimensional reaction pattern.

Still another mixer described in the above-cited article is the Ross LPD mixer. In this mixer, mixing is accomplished by producing a swirling effect as the fluid components pass through holes in the mixing elements. Adjoining mixing elements are connected together so that a tetrahedral space is formed between them. Each element has four circular holes aligned on a diameter on its face. In passing through each element, the position of the holes is changed so that the diameter on which the holes align is rotated 90° on the opposite face. Thus, by interchanging the sequence of holes in each element, the flow of liquid components is divided to produce mixing.

While the above-described mixers are adequate for reacting coreactants under most conditions, they do not produce adequate mixing where reactants must be rapidly mixed at relatively low flow rates. Accordingly, the reactor of the present invention is particularly suitable for use where two unusually reactive materials are to be mixed. Of course, the reactor of the present invention may be used for reacting most any type of coreactants.

SUMMARY OF THE INVENTION

Broadly speaking, the present invention is directed to a static reactor. The reactor includes a housing that delineates a reaction chamber having an intake and a discharge through which a stream of fluid components is to flow. A plurality a flow-converging members extend longitudinally within the reaction chamber between its intake and discharge. The flow-converging members are spaced from each other and form a channel within the reaction chamber to direct the flow of the fluid components substantially along the central axis of the reaction chamber. To this end, the total cross-sectional area of the channel defined by the flow-converging members is less than that of the housing.

A flow-deflecting element is arranged in the reaction chamber downstream of each flow-converging member to intercept substantially all of the body of fluid flow through the channel. When the body of fluid flow impinges the fluid-deflecting element, it is divided into a multiplicity of flow streams. Each of the flow streams are diverted by the flow-deflecting element to flow at an angle of approximately 90° from the central axis of the reaction chamber. This causes directed but unrestricted comingling of components producing complete mixing of the coreactants in a very short time where the body of fluid has passed through a reaction chamber having the appropriate number of flow-converging members and flow-deflecting elements.

PRINCIPAL OBJECT OF THE INVENTION

The particular object of the present invention is to provide a reactor for mixing fluid components wherein the reactor's reaction chamber has a plurality of flow-converging members arranged therein to direct the flow of the body of fluid components along the central axis thereof and a flow-deflecting element arranged downstream of each flow-converging member to divide and turn the body of fluid flow an angle of approximately 90° from the central axis of the reaction chamber.

Additional objects and advantages of the invention will become apparent from a detailed reading of the specification and drawings which are incorporated herein and made part of the specification.

BRIEF DESCRIPTION OF THE DRAWINGS

FIG. 1 is a perspective view, partly in section, of a form of reactor according to this invention;

FIG. 2 is a cross-sectional view along line 2—2 of FIG. 1;

FIG. 3 is a perspective view, partly in section, of another form of the reactor of this invention;

FIG. 4 is a perspective view, partly in section, of another embodiment of the reactor shown in FIG. 3; and FIG. 5 is a view along line 5—5 of FIG. 3.

DESCRIPTION OF THE PREFERRED EMBODIMENT

In FIG. 1, 10 is a square-shaped housing that defines a reaction chamber 20 through which fluid components A and B are caused to flow in order to be thoroughly mixed. Fluid component A is introduced into the intake or upstream end 14 of reaction chamber 20 through conduit or flow passageway 40. Fluid component B is introduced into the intake of the reaction chamber by means of conduit 44. Conduit 44 is concentrically arranged within conduit 40 to form an annular space therebetween through which fluid component A flows. And preferably, the tip of flow passageway 44 defines a sparger where fluid component B "squirts" through the holes therein. The fluid components after being thoroughly mixed in reaction chamber 20 flow out of the reaction chamber at the discharge or downstream end 16 and through conduit 42 as a homogeneous stream 18.

Within reaction chamber 20, a plurality of substantially square, flat sheets 30, 36 extend from the inner walls of housing 10. Sheets 30 and 36 each may be said to form a flow-converging member. These flow converging members extend longitudinally within the reaction chamber and are spaced from each other. A substantially square-shaped opening 32 is formed in each flow-converging member to form a fluid passageway or channel within reaction chamber 20 of a total cross-sectional area less than that of housing 10. As fluid components A and B flow into reaction chamber 20, the flow converging members act much like a nozzle to converge the flow of the body of fluid substantially along the central axis 22 of the reaction chamber.

Downstream of flow-converging member 30 is a flow-deflecting element 35 arranged on the central axis 22 of reaction chamber 20. Element 35 is a solid flat plate that is square in shape. Element 35 extends substantially in the channel formed by opening 32 in member 30 to present a flow-deflecting surface to the body of fluid flowing through the channel. That is to say, the cross-sectional area of the surface of element 35 perpendicular to the fluid flow through the channel is approximately equal to that of the opening in member 30, see FIG. 2. Thus, the flow-deflecting element is able to intercept substantially all of the body of fluid flowing through the channel upstream of the element.

The incoming stream of fluid components A and B is directed through the first channel in the reaction chamber toward element 35. When the stream of fluid components impinges the surface of element 35, the stream is divided into a number of different streams that are deflected at right angles from the central axis of the reaction chamber. The mixing action of the two coreactants occurs due to the high turbulence produced by dividing and deflecting the stream at an angle of approximately 90° to the direction of flow through the channel. As the body of fluid components flows past element 35, it is again converged to flow through the second channel formed by the opening in member 36. Downstream of this flow-converging member is a second flow-deflecting element 37. Element 37 again divides the flow into a multiplicity of streams that are deflected at right angles from the central axis of reaction chamber 20. This causes additional mixing so that a thoroughly mixed stream 18 flows through discharge end 16 of the reaction chamber.

It is noted that other arrangements for introducing and discharging fluid components into the reaction chamber may be used. It should also be understood that the fluid components may be any of a vast variety. For example, they may be a gas and a liquid, parts of the same liquid at different temperatures, a liquid and finely divided solid particles or, of course, two or more different liquids. Additionally, the fluid components may or may not be reactive with one another such that the resulting composition may be a mixture or a compound. But the present invention is especially useful for mixing two liquid coreactants at low flow rates where the coreactants have an extremely short reaction time.

This invention does have applicability to all flowable materials and the term "fluid components" is used to designate the general class of liquids, gases and other flowable materials which it may be desired to react. Also, it is noted that more than two fluid components may be mixed in the reactor of the present invention, the components A and B being merely illustrative.

In the form of the reactor shown in FIG. 3, wherein like numerals refer to like parts as in FIG. 1, fluid components A and B are directed into reaction chamber 201 formed by housing 101. Here, housing 101 is actually delineated by a portion of the walls of conduit 40 as the disk-washer arrangement, designated generally by reference numeral 80, of the reaction chamber is adopted to be operatively inserted within conduit 40 to fit securely therein. It is noted that washers 60 and 62, and disks 61 and 63 of arrangement 80 are supported on a frame consisting of rods 93 and 92.

The reactor may also be constructed to have a distinct housing 301, as illustrated in FIG. 4, wherein the housing is a hollow, cylindrical tube of uniform cross-section. The washers may be welded to the inner walls of housing 301 and the disks may depend from the washers by means of rods 93.

As discussed, within housing 101 there is concentrically arranged a disk-washer arrangement 80 that includes a plurality of washers or flow-converging members 60 and 62. The washers or doughnut-shaped members extend longitudinally within the reaction chamber from the inner walls of the housing and are spaced from each other. The circular openings defined by the washers form a channel along central axis 22 of the reaction chamber through which the fluid components flow.

Downstream of washer 60 is a flow-deflecting element or disk 61. And downstream of washer 62 is a disk 63. The diameter of each disk is approximately equal to or greater than that of the diameter of the opening through each washer, see FIG. 5. Thus, substantially all of the body of fluid components flowing through a particular washer will be intercepted by the flow-deflecting element downstream thereof.

This disk-washer arrangement serves to mix the fluid components passing through reaction chamber 201 in the following manner: The initial stream consisting of fluid components A and B flows through washer 60 to flow substantially along central axis 22 of housing 101 where the body of fluid flow after exiting washer 60 strikes the surface of first element 61. This splits the fluid flow into a number of individual streams that are deflected at an angle of approximately 90° from the direction of fluid flow through washer 60. Each stream containing both components A and B will be subject to turbulent flow as it flows around element 61, causing some mixing of the components. As the body of fluid components flow around disk or element 61, it is again converged by means of washer 62 to flow as a body along central axis 22 where it impinges second element 63. The body of fluid is again split and deflected at an angle of 90° from the direction of flow through washer 62, causing additional mixing of the fluid components. This process is repeated as the body of fluid flows through each washer and strikes each disk as the fluid pass through reactor chamber 201.

An appropriate number of disks and washers are arranged within reaction chamber 201 to split and recombine the multicomponent stream a sufficient number of times to achieve thorough mixing of the original components. The number of flow-converging members and flow-deflecting elements arranged in any reaction chamber of any embodiment of the present invention is dependent upon the fluid components to be reacted, their reaction time, and the flow rate. It is understood that, taking into consideration these factors, the appropriate number may be chosen.

The above embodiments of the present invention offer the advantage of accomplishing thorough reaction of coreactants within a short period of time at relatively low flow rates. To demonstrate this, the reactor of FIG. 3 was tested and compared with two commercially-available mixers—the Kenics and Koch mixers discussed heretofore. It was found that the reactor of the present invention produced a product superior to that produced by the two prior art mixers in reacting coreactants having a short reaction time at low flow rates.

In these runs, conduit 40 had a one inch I.D., conduit 44 a ⅜-inch I.D., and conduit 42 a one-half inch I.D. Reactant A was a chloroformate solution and reactant B was ethylenediamine (EDA). These two coreactants are used in the manufacture of the fuel additive described in U.S. Pat. No. 4,160,648, issued July 10, 1979 and assigned to the assignee of the present invention. The two reactants have an extremely short reaction time. Where both are mixed at the relatively low flow rate of approximately 10 gallons per minute, the reaction time is approximately 0.01 of a second. The basic nitrogen level of the product produced by reacting the two reactants is a good indicator of the thoroughness of the mixing. At a nitrogen level of 0.65 % or greater, it may be said that the coreactants have been thoroughly reacted. As expected, that the product's basic nitrogen level increased for each different mixer as the flow rate was increased. Higher basic nitrogen levels were also produced in each mixer as the charge ratio of EDA to chloroformate increased beyond a ratio of 5 to 1. For a given charge ratio and flow rate, a Kinecs mixer with six elements produced a product of a higher nitrogen level than a Koch assembly with eight elements. But the fuel additive made using the reactor of the present invention had a higher nitrogen level than any of the products made with the commercially-available mixers. In fact, a higher nitrogen level was realized with the reactor of the present invention even where the flow rates of the reactants were 27% less than those used with the eight-stage Koch mixer.

Although certain specific embodiments of the invention have been described in detail, the invention is not to be limited to only such embodiments but rather by the dependent claims.

What is claimed is:

1. A reactor for mixing fluid components, comprising:

a cylindrical housing defining a reaction chamber having an intake and a discharge through which a stream of fluid components is to flow;

a plurality of annular-shaped flow-converging members extending longitudinally within said reaction chamber between the intake and discharge, and spaced from each other and extending from the inner walls of said housing to define a channel within said housing along the central axis of said reaction chamber for the flow of the fluid components along said central axis;

a flow-deflecting disc-shaped element disposed in said channel downstream of each of said flow-converging members to intercept substantially all of the body of fluid flow to divide the body of fluid and to divert the flow approximately 90° from said central axis to flow around said flow-deflecting element, said disc-shaped elements having an area substantially equal to the area of said opening in said annular-shaped members;

an annular inlet means having a substantially coextensive outer perimeter with said reaction chamber housing for introducing a first reactant to said chamber; and sparger means for introducing a second reactant into the annulus defined by said inlet means in an initially generally perpendicular flow pattern to said first reactant.

2. The reactor of claim 1 wherein there are at least two flow-converging members and at least two flow-deflecting elements.

3. A reactor assembly for reacting together at least two reactants, comprising:

a housing defining a reaction chamber having an intake and discharge through which a stream of fluid components is to flow;

a plurality of flow-converging members extending longitudinally within said housing between the intake and the discharge, successive ones of said members spaced apart from each other and said members extending from the inner walls of said housing to define a flow channel through said housing along the central axis thereof, said channel having a total cross-sectional area less than that of said housing;

a flow-deflecting element arranged in said housing downstream of each of said members to intercept substantially all of the flow of the body of fluid through said channel to divide the body of fluid and divert its flow at an angle of approximately 90° from the direction of flow through a preceding one of said members, said flow-deflecting elements having a cross-sectional area substantially equal to the cross-sectional area of the flow-converging members;

a first flow passageway in communication with the intake of said reaction chamber for introduction of a first one of said reactants into said reaction chamber;

a second flow passageway in communication with the intake of said reaction chamber for introduction of a second one of said reactants into said reaction chamber; and a third flow passageway in communication with the discharge of said reaction chamber for flowing the mixed reactants from said reaction chamber.

4. The reactor assembly of claim 3 wherein said first and second flow passageways are cylindrically-shaped conduits with said second flow passageway being concentrically arranged within said first flow passageway to form an annular space therebetween.

5. The reactor assembly of claim 4 wherein said reactants flowing through said first and second flow passageways are intimately contacted with one another through sparger means at the intake of said reaction chamber to flow through said reaction chamber.

* * * * *